US009832694B2

(12) United States Patent
Kashiwase (10) Patent No.: US 9,832,694 B2
(45) Date of Patent: Nov. 28, 2017

(54) USER TERMINAL, BASE STATION, AND SERVER APPARATUS

(71) Applicant: KYOCERA CORPORATION, Kyoto (JP)

(72) Inventor: Susumu Kashiwase, Machida (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/024,694

(22) PCT Filed: Sep. 24, 2014

(86) PCT No.: PCT/JP2014/075319
§ 371 (c)(1),
(2) Date: Mar. 24, 2016

(87) PCT Pub. No.: WO2015/046268
PCT Pub. Date: Apr. 2, 2015

(65) Prior Publication Data
US 2016/0234740 A1    Aug. 11, 2016

(30) Foreign Application Priority Data

Sep. 25, 2013 (JP) .................................. 2013-198074

(51) Int. Cl.
*H04W 36/04* (2009.01)
*H04W 48/20* (2009.01)
(Continued)

(52) U.S. Cl.
CPC ........... *H04W 36/04* (2013.01); *H04W 48/20* (2013.01); *H04W 36/0061* (2013.01); *H04W 48/16* (2013.01); *H04W 84/045* (2013.01)

(58) Field of Classification Search
CPC H04W 36/04; H04W 84/045; H04W 36/0083
(Continued)

(56) References Cited

U.S. PATENT DOCUMENTS

2011/0201354 A1* 8/2011 Park .................... H04W 84/047
455/456.1
2011/0319076 A1* 12/2011 Ramasamy ........... H04W 48/16
455/434
(Continued)

FOREIGN PATENT DOCUMENTS

| JP | 2014-230220 A | 12/2014 |
|----|---------------|---------|
| WO | 96/10893 A1 | 4/1996 |
| WO | 2011/005019 A2 | 1/2011 |

OTHER PUBLICATIONS

International Search Report issued in PCT/JP2014/075319; dated Dec. 16, 2014.
(Continued)

*Primary Examiner* — Omoniyi Obayanju
(74) *Attorney, Agent, or Firm* — Studebaker & Brackett PC (57) ABSTRACT

UE 100 performs, in a mobile communication system in which a small cell is arranged within a coverage of a macro cell, a cell reselection on the basis of neighboring cell information broadcast from the macro cell. The UE 100 acquire, in a connected state in which the UE 100 is connected to the macro cell, from a server 400 that manages small cell information on the small cell, the small cell information via the macro cell. The neighboring cell information broadcast from the macro cell is information on a neighboring cell other than the small cell. The UE 100 performs, in an idle state, the cell reselection on the small cell on the basis of the small cell information acquired from the server 400.

4 Claims, 7 Drawing Sheets (51) Int. Cl.
    *H04W 84/04*     (2009.01)
    *H04W 36/00*     (2009.01)
    *H04W 48/16*     (2009.01)

(58) Field of Classification Search
    USPC .......................................................... 455/444
    See application file for complete search history.

(56) References Cited

U.S. PATENT DOCUMENTS

2014/0248878 A1* 9/2014 Wong ................ H04W 36/0061
                                                              455/436
2014/0349642 A1 11/2014 Shinada

OTHER PUBLICATIONS

Written Opinion issued in PCT/JP2014/075319; dated Dec. 16, 2014.
3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2; 3GPP TS 36.300; V11.6.0; Jun. 2013; pp. 1-209; Release 11; 3GPP Organizational Partners.
JP Office Action dated Jan. 10, 2017 from corresponding JP Appl No. 2013-198074, with concise statement of relevance, 4 pp.

* cited by examiner

SMALL Cell INFORMATION REQUEST

| IE/GROUP NAME | PRESENCE | RANGE | IE TYPE AND REFERENCE |
|---|---|---|---|
| MESSAGE TYPE | M | | |
| MACRO eNB1_CID | M | | INTEGER (1..4095,...) |
| UE LOCATION LAT | | -90.00.00.000 ~ 90.00.00.000 | FIX DIGIT NUM |
| UE LOCATION LOG | | -180.00.00.000 ~ 180.00.00.000 | FIX DIGIT NUM |

FIG. 10

SMALL Cell INFORMATION

| IE/GROUP NAME | PRESENCE | RANGE | IE TYPE AND REFERENCE |
|---|---|---|---|
| MESSAGE TYPE | M | | |
| MACRO eNB1_CID | M | | |
| NUM OF eNB | M | | INTEGER (0..4094,...) |
| intraFreqBlackCellList IntraFreqBlackCellList SIZE | | (1..maxCellBlack) | |
| IntraFreqNeighCellInfo | | | |
| physCellId PhysCellId, | O | ENUMERATED | {n4,...,n504,} |
| q-OffsetCell | O | ENUMERATED | {-24,...,24} |
| | | | |

USER TERMINAL, BASE STATION, AND SERVER APPARATUS

TECHNICAL FIELD

The present invention relates to a user terminal, a base station, and a server apparatus used in a mobile communication system.

BACKGROUND ART

In LTE (Long Term Evolution), specifications of which have been designed in 3GPP (3rd Generation Partnership Project) which is a project aiming to standardize a mobile communication system, a user terminal in an idle state performs a cell reselection on the basis of neighboring cell information broadcast periodically from a serving cell.

The neighboring cell information is a system information block type 4 (SIB4) to a system information block type 8 (SIB8), for example. The SIB4 is information on a neighboring cell within a frequency (Intra-frequency). The SIB5 is information on a neighboring cell of another frequency (Inter-frequency). The SIB6 to the SIB8 are information on a neighboring cell having a standard different from the LTE (E-UTRA).

Further, in recent years, attention is paid to a technology of increasing a communication capacity by arranging a small cell within a macro cell. The small cell is a pico cell or a femto cell, for example. The small cell belongs to the same frequency as the macro cell or a frequency different therefrom. Further, the small cell may comply with a standard different from that of the LTE (E-UTRA).

However, there is a problem that when a large number of small cells are arranged within a macro cell, an amount of neighboring cell information that should be broadcast by the macro cell increases and overhead caused along with the broadcasting of the neighboring cell information increases.

CITATION LIST

Non Patent Literature

[NPL 1] 3GPP Technical Specification "TS 36.300 V11.6.0" June, 2013

SUMMARY OF INVENTION

A user terminal according to a first aspect performs, in a mobile communication system in which a small cell is arranged within a coverage of a macro cell, a cell reselection on the basis of neighboring cell information broadcast from the macro cell. The user terminal comprises a controller configured to acquire, in a connected state in which the user terminal is connected to the macro cell, from a server apparatus that manages small cell information on the small cell, the small cell information via the macro cell. The neighboring cell information broadcast from the macro cell is information on a neighboring cell other than the small cell. The controller performs, in an idle state of the user terminal, the cell reselection on the small cell on the basis of the small cell information acquired from the server apparatus.

A base station according to a second aspect manages, in a mobile communication system in which a small cell is arranged within a coverage of a macro cell, the macro cell. The base station comprises a controller configured to broadcast neighboring cell information on a neighboring cell other than the small cell. The neighboring cell information is information utilized by a user terminal in an idle state for a cell reselection on a neighboring cell other than the small cell.

A server apparatus according to a third aspect is used in a mobile communication system in which a small cell is arranged within a coverage of a macro cell. The server apparatus comprises a controller configured to manage small cell information on the small cell. The controller provides the small cell information, via the macro cell, to a user terminal connected with the macro cell. The small cell information is information utilized by the user terminal in an idle state for a cell reselection on the small cell.

DESCRIPTION OF EMBODIMENTS

Overview of Embodiment

A user terminal according to the embodiment performs, in a mobile communication system in which a small cell is arranged within a coverage of a macro cell, a cell reselection on the basis of neighboring cell information broadcast from the macro cell. The user terminal comprises a controller configured to acquire, in a connected state in which the user terminal is connected to the macro cell, from a server apparatus that manages small cell information on the small cell, the small cell information via the macro cell. The neighboring cell information broadcast from the macro cell is information on a neighboring cell other than the small cell. The controller performs, in an idle state of the user terminal, the cell reselection on the small cell on the basis of the small cell information acquired from the server apparatus.

In the embodiment, the user terminal comprises a receiver configured to receive server information broadcast from the macro cell. The server information is information necessary for the user terminal to access the server apparatus. The controller acquires, on the basis of the server information, the small cell information, via the macro cell, from the server apparatus.

In the embodiment, the controller notifies the server apparatus of terminal location information indicating a geographical location of the user terminal to thereby acquire, from the server apparatus, the small cell information on the small cell located near the user terminal.

A base station according to the embodiment manages, in a mobile communication system in which a small cell is arranged within a coverage of a macro cell, the macro cell. The base station comprises a controller configured to broadcast neighboring cell information on a neighboring cell other than the small cell. The neighboring cell information is information utilized by a user terminal in an idle state for a cell reselection on a neighboring cell other than the small cell.

In the embodiment, the controller further broadcasts server information necessary for accessing a server apparatus that manages small cell information on the small cell. The small cell information is information utilized by a user terminal in an idle state for a cell reselection on the small cell.

A server apparatus according to the embodiment is used in a mobile communication system in which a small cell is arranged within a coverage of a macro cell. The server apparatus, comprises a controller configured to manage small cell information on the small cell. The controller provides the small cell information, via the macro cell, to a user terminal connected with the macro cell. The small cell information is information utilized by the user terminal in an idle state for a cell reselection on the small cell.

In the embodiment, the small cell information includes a cell identifier of the small cell. The controller manages the small cell information while associating the small cell information with a cell identifier of the macro cell. A high-order bit of the cell identifier of the small cell is identical to a high-order bit included in the cell identifier of the macro cell.

In the embodiment, the small cell information is associated with small cell location information indicating a geographical location of the small cell. The controller provides, on the basis of terminal location information notified from the user terminal, the small cell information on the small cell located near the user terminal, to the user terminal.

Embodiment

An embodiment of applying the present invention to the LTE system will be described below.

(System Configuration)

Figure 1:
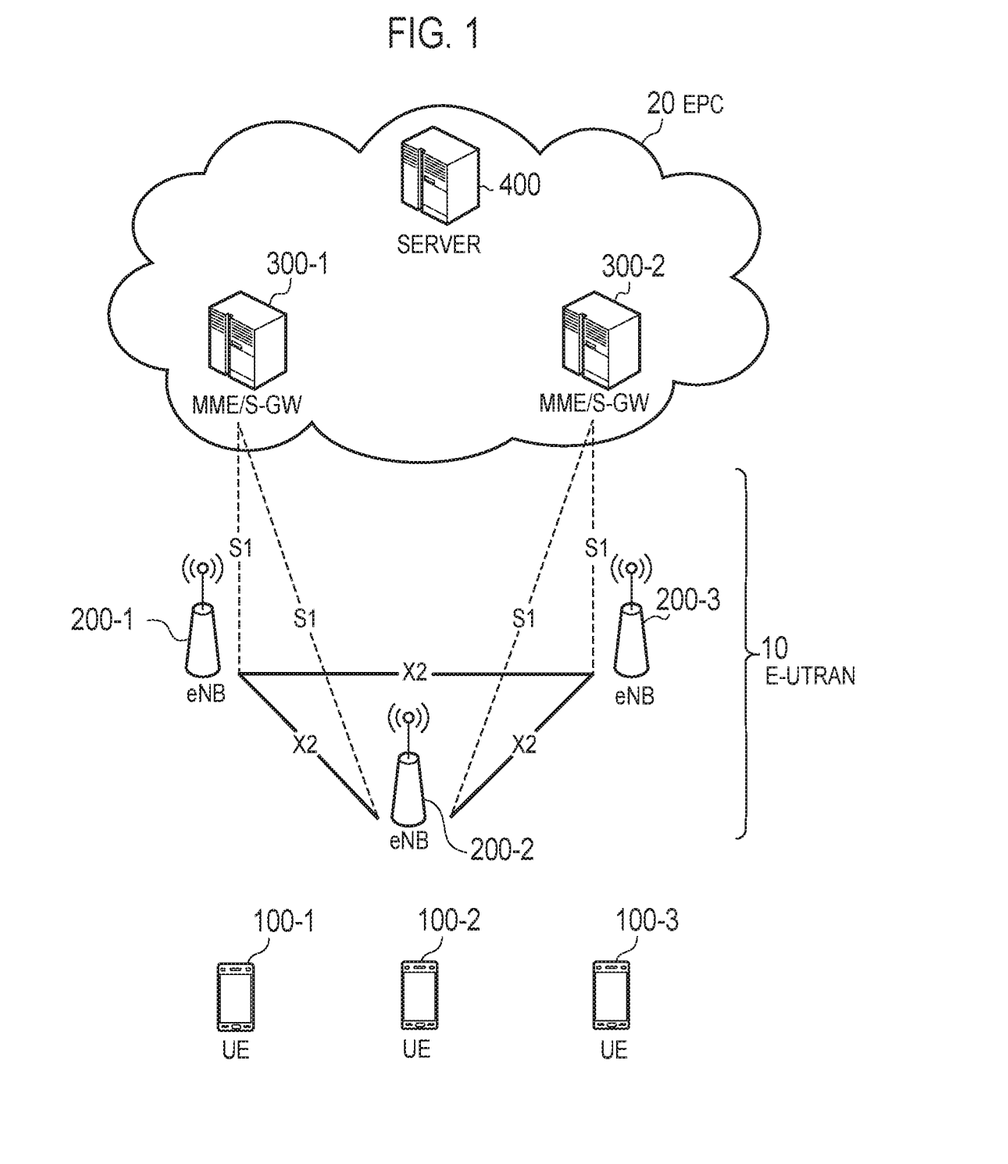
FIG. 1 is a configuration diagram of an LTE system according to an embodiment.

FIG. 1 is a configuration diagram of an LTE system according to an embodiment. As illustrated in FIG. 1, the LTE system includes a plurality of UEs (User Equipments) 100, E-UTRAN (Evolved-UMTS Terrestrial Radio Access Network) 10, and EPC (Evolved Packet Core) 20.

The UE 100 corresponds to a user terminal. The UE 100 is a mobile communication device and performs radio communication with a cell (a serving cell). Configuration of the UE 100 will be described later.

The E-UTRAN 10 corresponds to a radio access network. The E-UTRAN 10 includes a plurality of eNBs (evolved Node-Bs) 200. The eNB 200 corresponds to a base station. The eNBs 200 are connected mutually via an X2 interface. Configuration of the eNB 200 will be described later.

The eNB 200 manages one or a plurality of cells and performs radio communication with the UE 100 which establishes a connection with the cell of the eNB 200. The eNB 200 has a radio resource management (RRM) function, a routing function for user data, and a measurement control function for mobility control and scheduling, and the like. It is noted that the "cell" is used as a term indicating a minimum unit of a radio communication area, and is also used as a term indicating a function of performing radio communication with the UE 100.

The EPC 20 corresponds to a core network. A network of the LTE system is configured by the E-UTRAN 10 and the EPC 200. The EPC 20 includes a plurality of MME (Mobility Management Entity)/S-GWs (Serving-Gateways) 300. The MME performs various mobility controls and the like for the UE 100. The S-GW performs control to transfer user. MME/S-GW 300 is connected to eNB 200 via an S1 interface. Moreover, the EPC 200 includes a server 400. The configuration of the server 400 will be described later.

Figure 2:
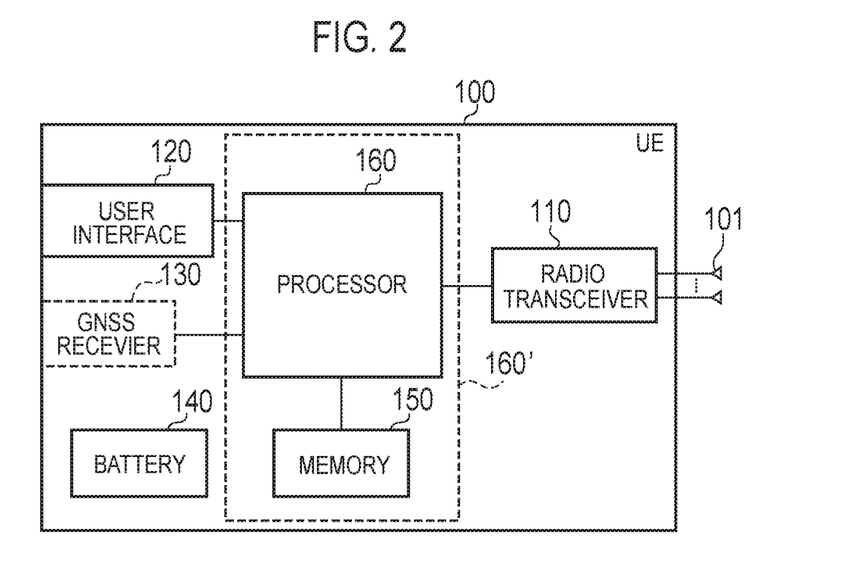
FIG. 2 is a block diagram of a UE according to the embodiment.

FIG. 2 is a block diagram of the UE 100. As illustrated in FIG. 2, the UE 100 includes plural antennas 101, a radio transceiver 110, a user interface 120, a GNSS (Global Navigation Satellite System) receiver 130, a battery 140, a memory 150, and a processor 160. The memory 150 corresponds a storage unit. The processor 160 (and the memory 150) constitute a controller. The UE 100 may not have the GNSS receiver 130. Furthermore, the memory 150 may be integrally formed with the processor 160, and this set (that is, a chip set) may be called a processor 160'.

The plural antennas 101 and the radio transceiver 110 are used to transmit and receive a radio signal. The radio transceiver 110 converts a baseband signal (a transmission signal) output from the processor 160 into the radio signal and transmits the radio signal from the antenna 101. Furthermore, the radio transceiver 110 converts a radio signal received by the antenna 101 into a baseband signal (a received signal), and outputs the baseband signal to the processor 160.

The user interface 120 is an interface with a user carrying the UE 100, and includes, for example, a display, a microphone, a speaker, various buttons and the like. The user interface 120 accepts an operation from a user and outputs a signal indicating the content of the operation to the processor 160. The GNSS receiver 130 receives a GNSS signal in order to obtain UE location information (longitude and latitude, etc.) indicating a geographical location of the UE 100, and outputs the received signal to the processor 160. The battery 140 accumulates power to be supplied to each block of the UE 100.

The memory 150 stores a program to be executed by the processor 160 and information to be used for a process by the processor 160. The processor 160 includes a baseband processor that performs modulation and demodulation, encoding and decoding and the like on the baseband signal, and CPU (Central Processing Unit) that performs various processes by executing the program stored in the memory 150. The processor 160 may further include a codec that performs encoding and decoding on sound and video signals. The processor 160 executes various processes and various communication protocols described later.

Figure 3:
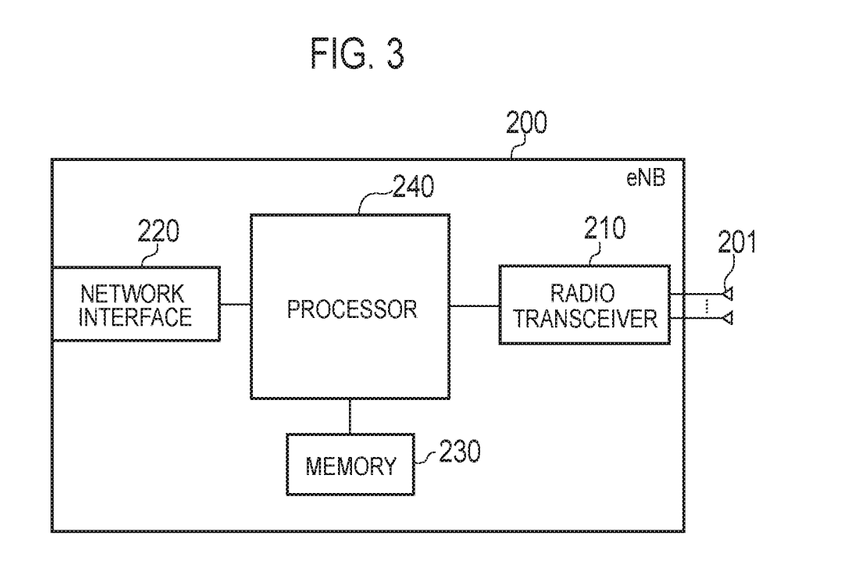
FIG. 3 is a block diagram of an eNB according to the embodiment.

FIG. 3 is a block diagram of the eNB 200. As illustrated in FIG. 3, the eNB 200 includes plural antennas 201, a radio transceiver 210, a network interface 220, a memory 230, and a processor 240. The memory 230 corresponds a storage unit. The processor 240 (and the memory 230) constitute a controller.

The plural antennas 201 and the radio transceiver 210 are used to transmit and receive a radio signal. The radio transceiver 210 converts a baseband signal (a transmission signal) output from the processor 240 into the radio signal and transmits the radio signal from the antenna 201. Furthermore, the radio transceiver 210 converts a radio signal received by the antenna 201 into a baseband signal (a received signal), and outputs the baseband signal to the processor 240.

The network interface 220 is connected to the neighboring eNB 200 via the X2 interface and is connected to the MME/S-GW 300 via the S1 interface. The network interface 220 is used in communication over the X2 interface and communication over the S1 interface.

The memory 230 stores a program to be executed by the processor 240 and information to be used for a process by the processor 240. The processor 240 includes a baseband processor that performs modulation and demodulation, encoding and decoding and the like on the baseband signal and CPU that performs various processes by executing the program stored in the memory 230. The processor 240 executes various processes and various communication protocols described later.

Figure 4:
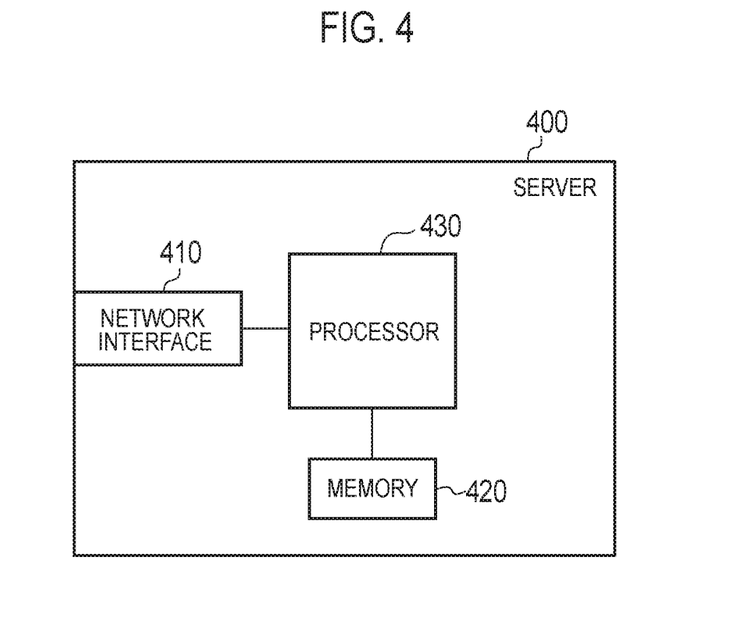
FIG. 4 is a block diagram of a server according to the embodiment.

FIG. 4 is a block diagram of the server 400. As shown in FIG. 4, the server 400 includes a network interface 410, a memory 420, and a processor 430. The memory 420 corresponds to a storage unit. The processor 430 (and the memory 420) constitute a controller.

The network interface 410 is used for communication, via the E-UTRAN 10, with the UE 100. The memory 420 stores a program to be executed by the processor 430 and information to be used for a process by the processor 430. The processor 430 executes a program stored in the memory 420 to perform various processes. The processor 430 executes various processes described later.

Figure 5:
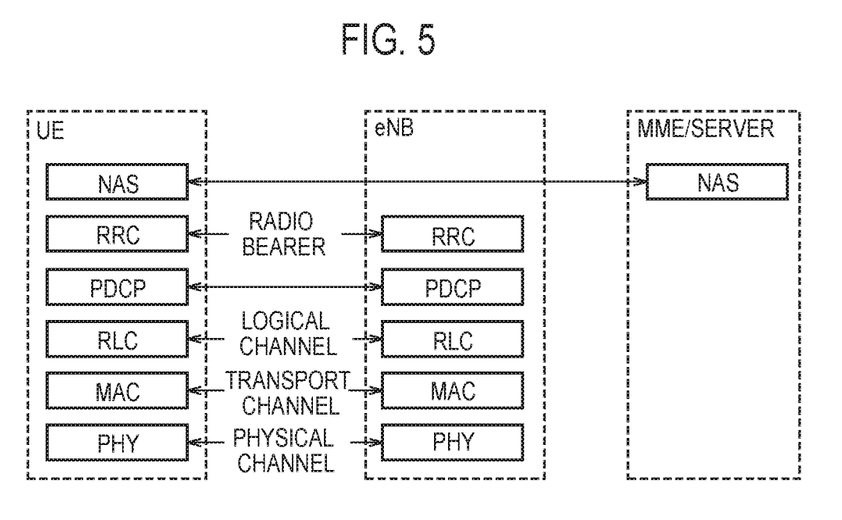
FIG. 5 is a protocol stack diagram of a radio interface according to the embodiment.

FIG. 5 is a protocol stack diagram of a radio interface in the LTE system. As illustrated in FIG. 5, the radio interface protocol is classified into a layer 1 to a layer 3 of an OSI reference model, wherein the layer 1 is a physical (PHY) layer. The layer 2 includes a MAC (Media Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. Between the PHY layer of the UE 100 and the PHY layer of the eNB 200, use data and control signal are transmitted via the physical channel.

The MAC layer performs priority control of data, a retransmission process by hybrid ARQ (HARQ), and the like. Between the MAC layer of the UE 100 and the MAC layer of the eNB 200, user data and control signal are transmitted via a transport channel. The MAC layer of the eNB 200 includes a scheduler that determines a transport format of an uplink and a downlink (a transport block size and a modulation and coding scheme (MCS)) and a resource block to be assigned to the UE 100.

The RLC layer transmits data to an RLC layer of a reception side by using the functions of the MAC layer and the PHY layer. Between the RLC layer of the UE 100 and the RLC layer of the eNB 200, user data and control signal are transmitted via a logical channel.

The PDCP layer performs header compression and decompression, and encryption and decryption.

The RRC layer is defined only in a control plane dealing with control signal. Between the RRC layer of the UE 100 and the RRC layer of the eNB 200, control message (RRC messages) for various types of configuration are transmitted. The RRC layer controls the logical channel, the transport channel, and the physical channel in response to establishment, re-establishment, and release of a radio bearer. When there is an RRC connection between the RRC of the UE 100 and the RRC of the eNB 200, the UE 100 is in a connected state (an RRC connected state), otherwise the UE 100 is in an idle state (an RRC idle state).

A NAS (Non-Access Stratum) layer positioned above the RRC layer performs a session management, a mobility management and the like.

Figure 6:
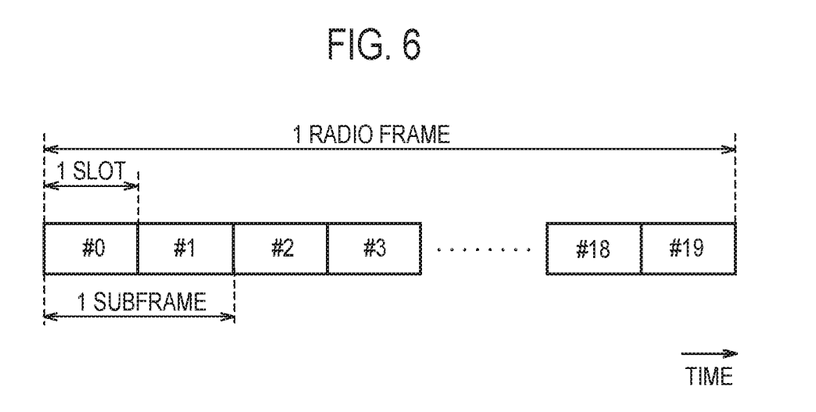
FIG. 6 is a configuration diagram of a radio frame according to the embodiment.

FIG. 5 is a configuration diagram of a radio frame used in the LTE system. In the LTE system, OFDMA (Orthogonal Frequency Division Multiplexing Access) is applied to a downlink, and SC-FDMA (Single Carrier Frequency Division Multiple Access) is applied to an uplink, respectively.

As illustrated in FIG. 6, the radio frame is configured by 10 subframes arranged in a time direction, wherein each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. The resource block includes a plurality of subcarriers in the frequency direction. Resource element is configured by one subcarrier and one symbol.

Among radio resources assigned to the UE 100, a frequency resource is configured by a resource block and a time resource is configured by a subframe (or slot).

In the downlink, an interval of several symbols at the head of each subframe is a control region used as a physical downlink control channel (PDCCH) for mainly transmitting a control signal. Furthermore, the other interval of each subframe is a region available as a physical downlink shared channel (PDSCH) for mainly transmitting user data.

In the uplink, both ends in the frequency direction of each subframe are control regions used as a physical uplink control channel (PUCCH) for mainly transmitting a control signal. Furthermore, the central portion in the frequency direction of each subframe is a region available as a physical uplink shared channel (PUSCH) for mainly transmitting user data.

(Operation According to Embodiment)

(1) Operation Overview

Figure 7:
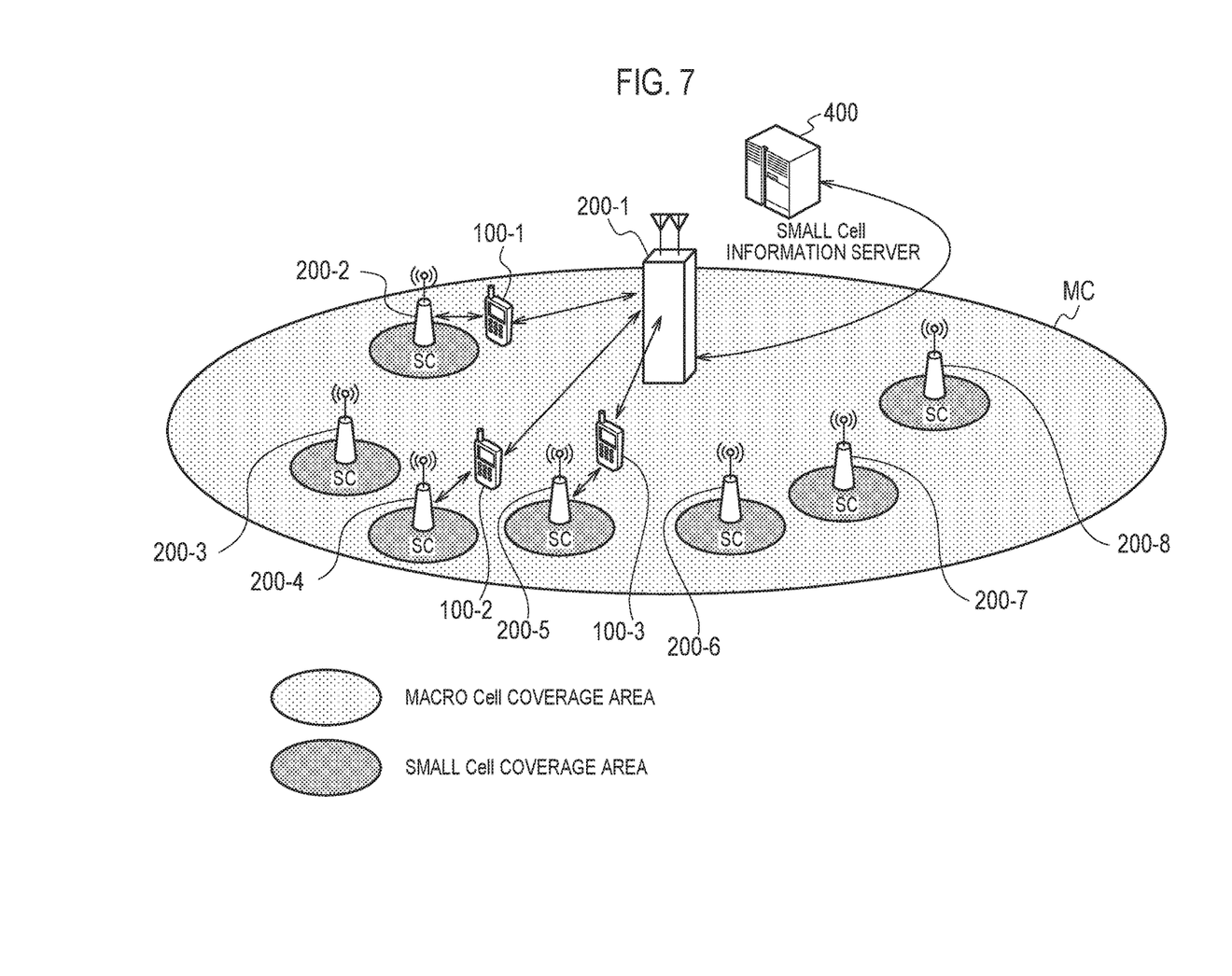
FIG. 7 is a diagram for describing an operation environment according to the embodiment.

FIG. 7 is a diagram for describing an operation environment according to the embodiment.

As shown in FIG. 7, in the embodiment, an environment in which a small cell SC is arrange within a macro cell MC (a so-called HetNet environment) is assumed. The small cell SC is a pico cell or a femto cell, for example. In an example of FIG. 7, the number of small cells SC within the macro cell MC is seven; however, in a real environment, a large number of small cells SC are arranged in the macro cell MC. Further, in a real environment, another macro cell MC in the neighborhood of the macro cell MC is present.

The eNB 200-1 manages the macro cell MC. Each of the eNB 200-2 to the eNB 200-8 manages the small cell SC. The small cell SC belongs to the same frequency as the macro cell MC or a frequency different therefrom. It is noted that the small cell SC may comply with a standard different from that of the LTE (E-UTRA). A cell identifier such as a physical cell identifier (PCI) is assigned to each cell. Each cell transmits, in the cell, a radio signal by which it is possible to specify the PCI of the cell.

In the macro cell MC, a plurality of UEs 100 (UEs 100-1 to 100-3) exist. That is, the macro cell MC is a serving cell for each of the UEs 100-1 to 100-3. The UE 100 may be in a connected state in the macro cell MC or in an idle state therein.

The UE 100 in an idle state performs a reselection of a serving cell (cell reselection) while moving. Specifically, the UE 100 in an idle state performs the cell reselection on the basis of neighboring cell information periodically broadcast from the serving cell.

The neighboring cell information includes a neighboring cell list that is a list of a cell identifier (PCI) of a neighboring cell and a parameter of the cell reselection. The UE 100 detects a neighboring cell by a cell search based on the neighboring cell information to perform the cell reselection.

The neighboring cell information is SIB4 to SIB8, for example. The SIB4 is information on a neighboring cell within a frequency (Intra-frequency). The SIB5 is information on a neighboring cell of another frequency (Inter-frequency). The SIB6 to the SIB8 are information on a neighboring cell having a standard different from the LTE (E-UTRA).

When a large number of small cells SC are arranged within the macro cell MC, an amount of neighboring cell information that should be broadcast by the macro cell MC increases and overhead caused along with the broadcasting of the neighboring cell information increases. Specifically, an information amount of the SIB4 to the SIB8 that should be broadcast by the macro cell MC increases, and a consumption amount of the radio resource caused along with the broadcasting increases. Further, an upper limit on an information amount storable in the SIB4 to the SIB8 may be exceeded.

Therefore, in the embodiment, the UE 100, the eNB 200-1, and the server 400 reduce the overhead caused along with the broadcasting of the neighboring cell information as follows.

The UE 100 according to the embodiment performs the cell reselection on the basis of the neighboring cell information broadcast from the macro cell MC. In the connected state where the UE 100 is connected with the macro cell MC, the UE 100 acquires small cell information, via the macro cell MC, from the server 400 that manages the small cell information on the small cell SC. The neighboring cell information broadcast from the macro cell MC is information on a neighboring cell (neighboring macro cell MC, for example) other than the small cell SC. In the idle state, the UE 100 performs the cell reselection on a small cell SC on the basis of the small cell information acquired from the server 400.

Thus, when the small cell information is provided from the server 400 to the UE 100, it is possible to exclude the small cell information from the neighboring cell information (the SIB4 to the SIB8) broadcast from the macro cell MC, resulting in reduction of overhead caused along with the broadcasting of the neighboring cell information. Further, even when the small cell information is excluded from the neighboring cell information broadcast from the macro cell MC, the UE 100 is capable of performing the cell reselection on a small cell SC.

The UE 100 may receive server information broadcast from the macro cell MC. The server information is information (address information, for example) necessary for the UE 100 to access the server 400. In this case, the UE 100 acquires the small cell information, via the macro cell MC, from the server 400, on the basis of the server information. Thus, even when there are a plurality of servers 400 or when the UE 100 does not grasp the presence of the server 400, it is possible that the UE 100 is accessible to the server 400.

When notifying the server 400 of UE location information indicating a geographical location of the UE 100, the UE 100 may acquire from the server 400 the small cell information on the small cell SC located near the UE 100. Thus, it is possible to reduce the number of small cells SC that should be searched by the UE 100, and thus, it is possible to reduce a power consumption of the UE 100.

The eNB 200-1 according to the embodiment manages the macro cell MC. The eNB 200-1 broadcasts neighboring cell information on a neighboring cell other than the small cell SC. The neighboring cell information is information utilized by the UE 100 in an idle state to perform the cell reselection on a neighboring cell other than the small cell SC. The eNB 200-1 may further broadcast the server information necessary for accessing the server 400.

The server 400 according to the embodiment manages small cell information on the small cell SC. The server 400 provides the small cell information, via the macro cell MC, to the UE 100 connected with the macro cell MC.

The small cell information includes the cell identifier of the small cell SC. For example, the small cell information includes a small cell list that is a list of a cell identifier (PCI) of the small cell SC and a parameter of the cell reselection. The server 400 manages the small cell information while associating the same with the cell identifier of the macro cell MC. Thus, to the UE 100, the server 400 is capable of providing only the small cell information on the small cell SC within the macro cell MC connected by the UE 100, to the UE 100.

It is noted that when a high-order bit of the cell identifier of the small cell SC is identical to a high-order bit included in the cell identifier of the macro cell MC, it is possible to easily associate the macro cell MC with the small cell SC.

The server 400 may manage the small cell information while associating the same with the small cell SC location information indicating the geographical location (a longitude and a latitude, for example) of the small cell SC. In this case, the server 400 is capable of providing, to the UE 100, the small cell information on the small cell SC located near the UE 100, on the basis of the UE location information notified from the UE 100.

(2) Operation Sequence

Figure 8:
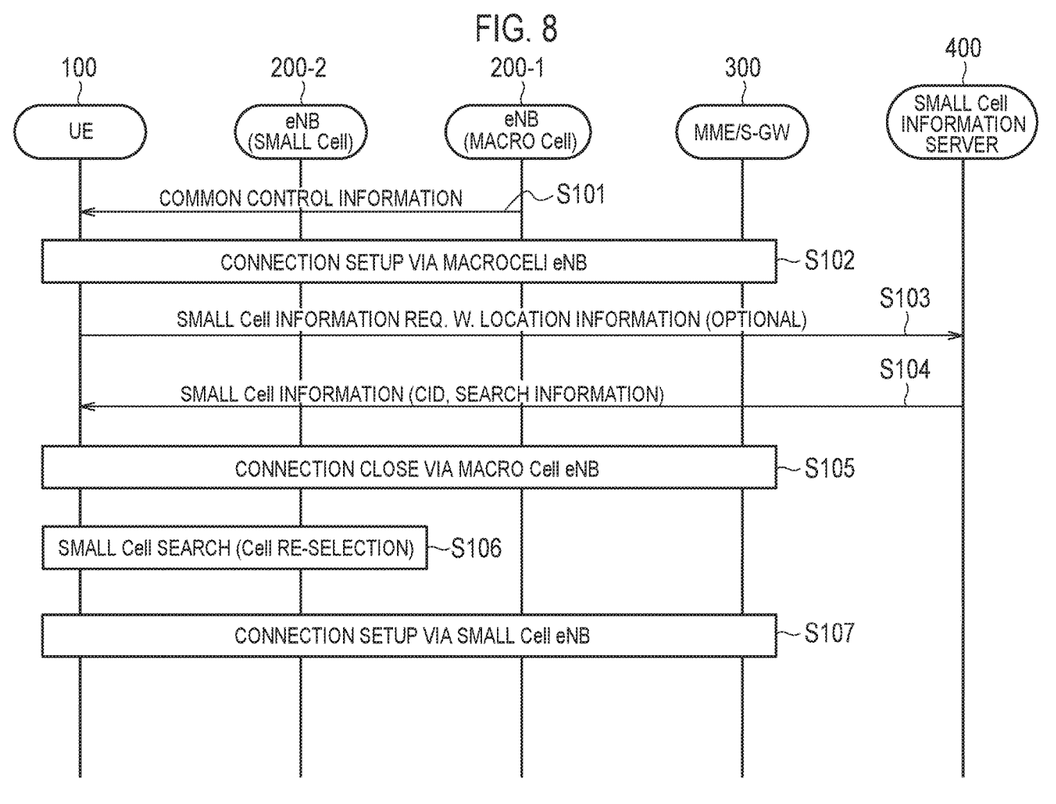
FIG. 8 is an operation sequence chart according to the embodiment.

Next, an operation sequence according to the embodiment will be described. FIG. 8 is an operation sequence chart according to the embodiment. In an initial state of FIG. 8, in the macro cell MC, the UE 100 is in an idle state.

As shown in FIG. 8, in step S101, the eNB 200-1 that manages the macro cell MC broadcasts common control information (system information) applied commonly to all the UEs 100 within the macro cell MC.

The common control information includes serving cell information (the SIB1 and the SIB2, for example) on its own cell (macro cell MC) and the neighboring cell information (the SIB4 to the SIB8, for example). As described above, the neighboring cell information broadcast from the macro cell MC the is information on the neighboring cell (neighboring macro cell MC, for example) other than the small cell SC. The common control information may further include the server information necessary for accessing the server 400.

In step S102, the UE 100 that receives the serving cell information out of the common control information establishes an RRC connection with the macro cell MC on the basis of the serving cell information, and establishes a bearer with the EPC 20 (MME/S-GW 300). As a result, the UE 100 transitions from the idle state to the connected state. It is noted that when establishing the RRC connection for a purpose of accessing the server 400, the UE 100 may transmit, to the macro cell MC, information indicating a connection for accessing the server 400, in a connection establishment procedure with the macro cell MC.

In step S103, the UE 100 transmits, to the server 400, a small cell information request for requesting provision of the small cell information. Here, the UE 100 may set the server 400 to which the small cell information request is addressed, on the basis of the server information received from the macro cell MC. Further, the small cell information request may include the UE location information. The small cell information request may include the cell identifier of the macro cell MC.

In step S104, the server 400 that receives the small cell information request from the UE 100 extracts the small cell information on the small cell SC within the macro cell MC connected by the UE 100, and provides the small cell information to the UE 100. Further, the server 400 may provide, to the UE 100, only the small cell information on the small cell SC located near the UE 100, on the basis of the UE location information. The server 400 may use a NAS message to transmit the small cell information to the UE 100. The UE 100 stores the small cell information acquired from the server 400.

In step S105, the UE 100 releases the RRC connection with the macro cell MC, and releases the bearer with the EPC 20 (MME/S-GW 300). As a result, the UE 100 transitions from the connected state to the idle state.

In step S106, the UE 100 detects a small cell SC by a cell search based on the small cell information to perform the cell reselection. Thus, the UE 100 changes the serving cell from the macro cell MC to the small cell SC.

In step S107, the UE 100 establishes the RRC connection with the small cell SC, and establishes the bearer with the EPC 20 (MME/S-GW 300).

Figure 9:
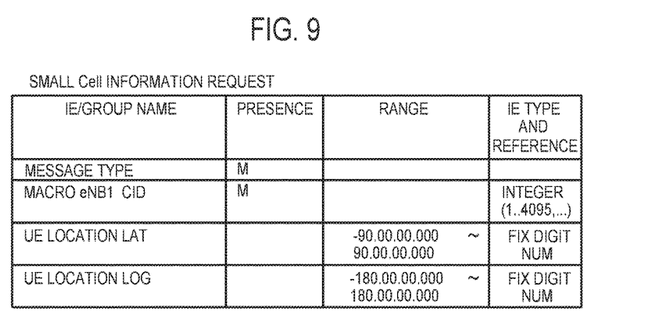
FIG. 9 is a configuration example of a small cell information request according to the embodiment.
Figure 10:
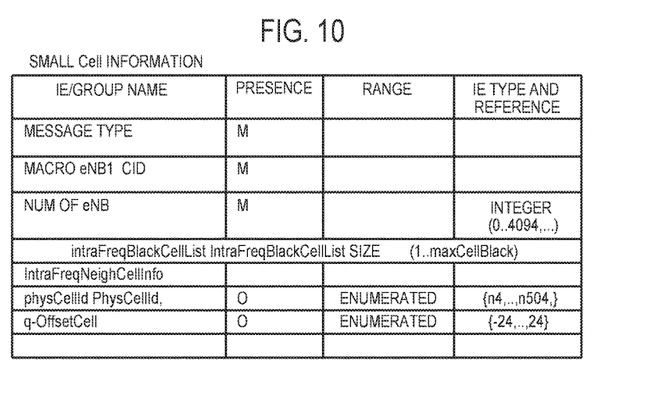
FIG. 10 is a configuration example of the small cell information request according to the embodiment.

Next, an example of a message configuration utilized in the above-described operation sequence will be described. FIG. 9 is a configuration example of the small cell information request transmitted from the UE 100 to the server 400. FIG. 10 is a configuration example of the small cell information transmitted from the server 400 to the UE 100.

As shown in FIG. 9, the small cell information request includes: an information element indicating a message type corresponding to the small cell information request; a information element indicating the cell identifier of the serving cell (macro cell MC); an information element indicating a longitude (Log) of the UE 100; and an information element indicating a latitude (LAT) of the UE 100.

As shown in FIG. 10, the small cell information includes: an information element indicating a message type corresponding to the small cell information; an information element indicating the cell identifier of the serving cell (macro cell MC) of the UE 100; an information element indicating the number of small cells SC corresponding to the small cell information; a black cell list information element (BlackCellList) that is a list of a PCI of a small cell SC in which a camp is prohibited; a small cell list information element (NeighCellInfo) that is a list of a PCI of a small cell SC in which a camp is permitted; and a parameter information element (q-OffsetCell) of the cell reselection.

(Summary of Embodiment)

As described above, the UE 100 performs the cell reselection on the basis of the neighboring cell information broadcast from the macro cell MC. In the connected state where the UE 100 is connected with the macro cell MC, the UE 100 acquires small cell information, via the macro cell MC, from the server 400 that manages the small cell information on the small cell SC. The neighboring cell information broadcast from the macro cell MC is the information on a neighboring cell other than the small cell SC. In the idle state, the UE 100 performs the cell reselection on a small cell SC on the basis of the small cell information acquired from the server 400.

Thus, when the small cell information is provided from the server 400 to the UE 100, it is possible to exclude the small cell information from the neighboring cell information (the SIB4 to the SIB8) broadcast from the macro cell MC, resulting in reduction of overhead caused along with the broadcasting of the neighboring cell information. Further, even when the small cell information is excluded from the neighboring cell information broadcast from the macro cell MC, the UE 100 is capable of performing the cell reselection on a small cell SC.

Other Embodiments

In the above-described embodiment, an example is described where the server 400 provides the small cell information on the small cell SC located near the UE 100 to the UE 100, on the basis of the UE location information notified from the UE 100. However, instead of such an operation, when small cell location information is included in the small cell information, it may be possible for the UE 100 to determine the small cell SC located near the UE 100.

In the embodiment described above, although an LTE system is described as an example of a mobile communication system, it is not limited to the LTE system, and the present invention may be applied to a system other than the LTE system.

It is noted that the entire content of Japanese Patent Application No. 2013-198074 (filed on Sep. 25, 2013) is incorporated in the present specification by reference.

INDUSTRIAL APPLICABILITY

According to the present invention, it is possible to reduce overhead caused along with broadcasting of neighboring cell information.

The invention claimed is:

1. In a mobile communication system in which a small cell is arranged within a coverage of a macro cell, a user terminal that performs a cell reselection on the basis of neighboring cell information broadcast from the macro cell, comprising: a receiver configured to receive server information broadcast from the macro cell when the user terminal is in an idle state in which the user terminal has no Radio Resource Control (RRC) connection with the macro cell, wherein the server information is information necessary for the user terminal to access a server apparatus managing small cell information on the small cell, and a controller configured to: establish the RRC connection with the macro cell on the basis of the server information, transition from the idle state to an RRC connected state in which the user terminal has the RRC connection with the macro cell, and acquire, in the RRC connected state, from the server apparatus, the small cell information via the macro cell, wherein the neighboring cell information broadcast from the macro cell is information on a neighboring cell other than the small cell, wherein the controller is further configured to: after acquiring the small cell information from the server apparatus, release the RRC connection with the macro cell and transition from the RRC connected state to the idle state, perform, in the idle state, cell reselection on the small cell on the basis of the small cell information acquired from the server apparatus.

2. The user terminal according to claim 1, comprising: a receiver configured to receive server information broadcast from the macro cell, wherein the server information is information necessary for the user terminal to access the server apparatus, and the controller acquires, on the basis of the server information, the small cell information, via the macro cell, from the server apparatus.

3. The user terminal according to claim 1, wherein the controller notifies the server apparatus of terminal location information indicating a geographical location of the user terminal to thereby acquire, from the server apparatus, the small cell information on the small cell located near the user terminal.

4. The user terminal according to claim 1, wherein the server information includes an address of the server apparatus, the controller is further configured to transmit, in the RRC connected state, to the server apparatus based on the address, a small cell information request.

* * * * *